United States Patent [19]

Morales et al.

[11] Patent Number: 4,525,472

[45] Date of Patent: Jun. 25, 1985

[54] PROCESS FOR CATALYST PREPARATION FOR THE HYDRODEMETALLIZATION OF HEAVY CRUDES AND RESIDUES

[75] Inventors: Alfredo Morales; Roberto Galiasso; Angel R. Carrasquel, all of Caracas, Venezuela

[73] Assignee: Intevep, S.A., Venezuela

[21] Appl. No.: 469,079

[22] Filed: Feb. 23, 1983

[51] Int. Cl.$^3$ .................. B01J 23/26; B01J 23/28
[52] U.S. Cl. .................. 502/323; 502/322; 502/306; 502/307; 502/355; 502/439; 208/216 PP; 208/251 H
[58] Field of Search ............ 502/305, 321, 322, 306, 502/307, 323, 439, 355; 208/251 H, 216 PP

[56] References Cited

U.S. PATENT DOCUMENTS

| | | | |
|---|---|---|---|
| 4,045,372 | 8/1977 | Warthen et al. | 502/439 |
| 4,069,140 | 1/1978 | Wunderlich | 208/251 H |
| 4,119,531 | 10/1978 | Hopkins et al. | 502/322 |
| 4,140,773 | 2/1979 | Stowell et al. | 502/355 |
| 4,179,411 | 12/1979 | Broersma et al. | 208/216 PP |
| 4,181,602 | 1/1980 | Quick et al. | 208/251 H |
| 4,301,037 | 11/1981 | Sanchez et al. | 502/439 |
| 4,389,304 | 6/1983 | Eastman et al. | 502/307 |
| 4,411,824 | 10/1983 | Chen | 208/251 H |
| 4,440,631 | 4/1984 | Togari et al. | 208/112 |

*Primary Examiner*—D. E. Gantz
*Assistant Examiner*—Anthony McFarlane
*Attorney, Agent, or Firm*—Baker & McKenzie

[57] ABSTRACT

A catalyst for the hydrotreatment of heavy crudes and residues and a method for the preparation thereof are claimed, specifying an amount of Group VIb metallic hydrogenation compound irreversibly absorbed by the silica or alumina extruded support structure surface to be between 0.5 and 3% of the dried and calcined catalyst by weight. The percentage limit on the hydrogenation compound can be achieved by either obtaining a dense alumina support structure having a novel pore diameter distribution, or treating a prior art support with an absorption site restricter such as MgO prior to hydrogenation compound impregnation. Subsequent fabrication steps comprise washing, drying, calcining and presulfurizing. The resultant catalyst has a monolayer of hydrogenating compound deposited on the reaction surface, and interfering compounds such as massive $MoO_3$, $Al(MoO_4)_3$ or polymolybdates are not formed. The unimetallic catalyst is demonstrated to be comparable or superior to a bimetallic catalyst employing five times as much hydrogenating metal, and has superior service life due to uniform metal contaminant deposition throughout the catalyst interior.

8 Claims, 3 Drawing Figures

CHEMICAL ABSORPTION ISOTHERMS OF MOLYBDENUM FOR VARIOUS ALUMINE TYPE SUPPORT

DISTRIBUTION OF THE VANADIUM DEPOSITED IN THE CATALYSTS $A_I$ AND D

PROCESS FOR CATALYST PREPARATION FOR THE HYDRODEMETALLIZATION OF HEAVY CRUDES AND RESIDUES

INTRODUCTION

This invention relates to a novel catalyst for the hydrodemetallization of heavy crudes and residues and a process for the catalyst's preparation.

In the art it is known that metals content in petroleum hydrocarbons may be reduced by treatment with a catalyst. Among the catalysts effective for this purpose are those which combine metallic compounds of atoms coming from Group VIB of the Periodic Table with metallic compounds of Group VIII. These compounds are usually dispersed over a carrier or support, such as alumina, silica or a silica-alumina combination.

DESCRIPTION OF THE PRIOR ART

Numerous references exist which describe the preparation of catalyst for hydrodesulfurization and/or hydrodemetallization of petroleum hydrocarbons. U.S. Pat. No. 3,232,887 describes a catalyst containing 3% CoO by weight, 13% molybdenum as $MoO_3$ and 3.25% phosphorus present as $P_2O_5$ supported on alumina. U.S. Pat. Nos. 2,687,985 and 2,769,758 use bauxite as a demetallizing catalyst. Iron hydroxide supported on alumina (U.S. Pat. No. 2,764,525), alumina, and artificial or synthetic clays (U.S. Pat. No. 2,771,401) have also been used.

Hydrodemetallization catalysts are known in the art which use a metal of Group VIB of the Periodic Table and at least one metal of Group VIb of the Periodic Table and at least one metal of Group VIII, as supported on an alumina substrate having special physical properties. Wilson, U.S. Pat. No. 3,989,155, uses at least one metal of group VIb (5–40% by weight) and at least one metal of Group VIII (0.1–4.0% by weight) as supported on macroporous alumina. U.S. Pat. No. 4,181,602 describes a catalyst containing a hydrogenation component selected from $MoO_3$ (5–15% by weight) and $Cr_2O_3$ (5–20% by weight), promoted with CoO (0.1–5% by weight), and again supported on macroporous alumina.

In U.S. Pat. No. 4,119,531, the described catalyst uses only one hydrogenating metal with no promoter. These metals are deposited on an alumina structure containing large pores. The hydrogenating metal belongs to group VIb, and is present in very small quantities, between 0.5% and 3% by weight.

U.S. Pat. No. 4,016,067 claims a method for the elimination of metals from residual fractions by means of a catalyst formed by a metal of Group VIb and iron oxide, as supported on an aluminum oxide containing delta and theta phases.

Hensley, U.S. Pat. No. 4,225,421, uses a catalyst for the hydrodemetallization and hydrodesulfurization of hydrocarbon feedstocks which contain asphaltenes and metals. The catalyst consists of a hydrogenation metal selected from Group VIb as deposited on a bimodal alumina. Hensley describes an overall method using in a first reaction zone a low concentration of $MoO_3$, (about 1% by weight), supported on a large pore alumina support. In the second reaction zone, a bimodal catalyst containing approximately 10% by weight of $MoO_3$ is used. As used by Hensley, "Bimodal" means that the support material has two pores in two chemically important ranges, i.e., micropores with diameters of less than 600 Å and macropores with diameters of 600 Å and macropores with diameters of 600 Å or greater.

Not one of these prior art references describes a catalyst for the hydrodemetallization of heavy crudes or residues in which the support material has special site adsorption properties or is modified so that it can chemically adsorb a low percentage of the hydrogenation metal, which metal is dispersed so effectively over the surface of the support that it is comparable to a catalyst having high metal content and in addition does not form undesirable compounds such as massive (as opposed to laminar) $MoO_3$ and/or $Al_2(MoO_4)_3$.

SUMMARY OF THE INVENTION

Accordingly, a principal object of the invention is to prevent the formation of massive $MoO_3$, $Al_2(MoO_4)_3$ or similar undesirable compounds by providing a hydrotreating catalyst which has a restricted number of chemical adsorption sites for hydrodemetallizing metallic compounds. This object is accomplished by either providing a catalyst support structure having a different pore diameter distribution than present in prior art supports, or by treating a commercial support with an adsorption site blocker such as magnesium oxide or zinc oxide.

Another object of the invention is to provide a hydrotreating catalyst that retains its effectiveness after long periods of continuous use due to uniform hydrocarbon contaminant deposition. Catalyst replacement rates are thereby reduced.

It is yet another object of the invention to provide a hydrotreating catalyst which is relatively economical to manufacture due to the low amount of hydrogenating metal required.

Other objects of the invention will become known from the Detailed Description of the Preferred Embodiments set forth hereinafter.

DETAILED DESCRIPTION OF PREFERRED EMBODIMENTS

Figure 1:
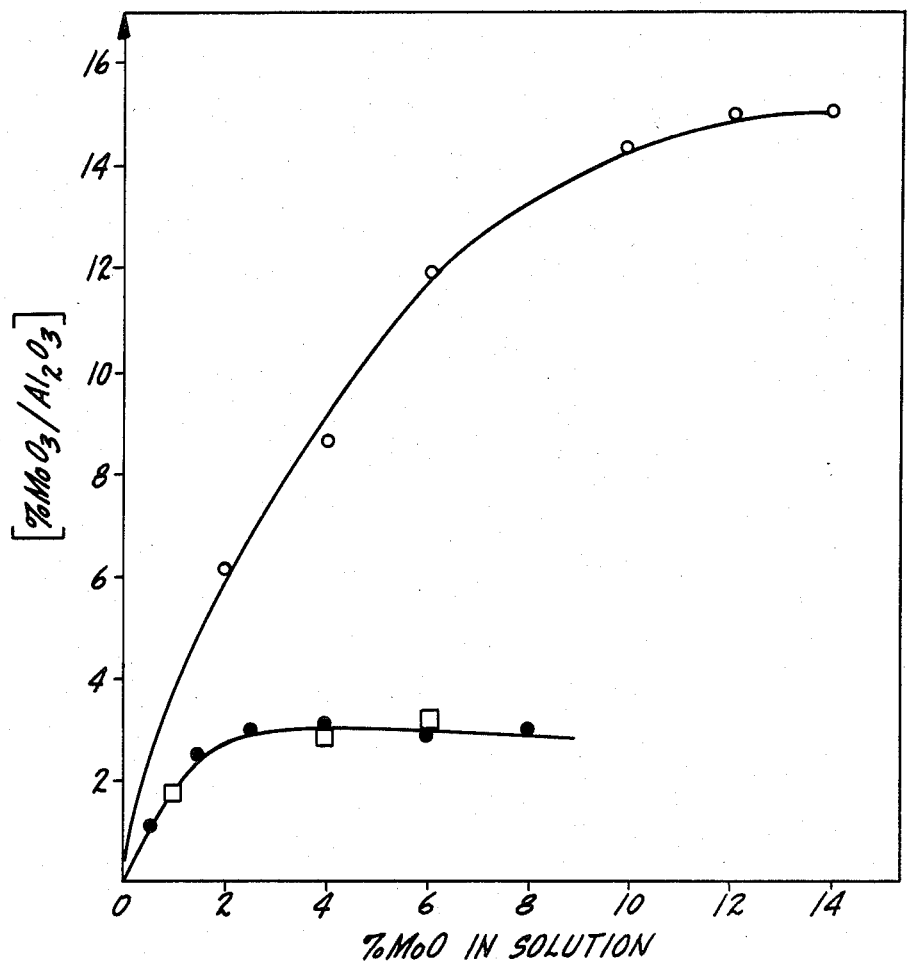
FIG. 1 is a graph of the isotherms for chemical absorption of a molybdenum compound by the support structures of the invention and one of the prior art, according to the test data obtained in Example 1.

The present invention concerns a new catalyst for the hydrodemetallization of heavy crudes and residues. The hydrocarbon feedstocks which can be effectively treated by the catalyst include those with V, Ni, or Fe contents exceeding 1000 ppm, and/or asphaltene contents as high as 25% by weight.

The catalyst according to the present invention comprises a hydrogenation compound whose metal component is selected from Group VIb of the Periodic Table, as deposited on a support of alumina, silica or a combination of these. The hydrogenation compound comprises one metal only and may be present as the element, an oxide, a sulfide or a mixture of the aforenamed. Any metal of Group VIb can be used in the compound. The hydrogenation compound is present in concentrations of between 0.5 and 3% by weight, calculated as the oxide of the respective metal and based on the total weight of the catalyst, and is preferably present in concentrations of 1–2.5%.

The base or support material is a special structure, of preferably alumina, whose surface area is at least 150 to 260 square meters per gram, and which has a total pore volume of at least 0.50–1.2 cc/gram, at least 40–80% of said pore volume consisting of pores larger than 300 Angstroms in diameter. The support can be extruded in the form of spheres or pellets in sizes ranging from 1/20 to ⅛ inch. The The support preferably should have a surface area between 160 and 200 m²/gram, a total pore volume ranging between 0.7 and 0.9 cc/gram, between 50 and 70% of which consists of pores having diameters larger than 300 Å. Preferable extruded product sizes range in diameter from 1/32 to 1/16 inch and from 1 to 3 millimeters in length.

The support of the invention contains a number of adsorption sites for Group VIb metal sufficient to irreversibly adsorb a quantity of hydrogenating metal that will make up no more than 3% of the weight of the catalyst, calculated as oxide. This control of the number of adsorption sites makes is possible to obtain the maximum quantity of metal exposed in the surface, maximum dispersion of the hydrogenating metal and at the same time minimum formation of $Al_2(MoO_4)_3$ and massive $MoO_3$.

The physical properties of a support having this small number of adsorption sites are set out in Column 1 of Table 1. If a selected, untreated support does not have this number of adsorption sites, between 0.2 and 4 percent by weight of an adsorption site restricter such as MgO, ZnO, MnO, $Ga_2O_3$ or $Fe_2O_3$ can be added to the support prior to the hydrogenation compound impregnation phase of fabricating the invention. For this purpose, the aforementioned site-restricting compounds should preferably be added in between 0.25 and 3% by weight of the completed catalyst, calculated as oxide.

After addition of a site restricter, where such is found necessary, the supports are impregnated with the hydrogenation compound. As previously described, adsorption must not exceed 3% by weight, determined as oxide and based on the total weight of the catalyst.

Several ways of impregnating various reactive compounds on a refractory oxide support are known in the art. One way, called successive impregnation, is carried out by a refractory support being impregnated by a first compound, dried, and then calcined. The process is repeated for the impregnation of successive reactive compounds.

Another type of impregnation is known as dry impregnation, where an exact volume equal to the retention volume of the refractory oxide is added from a solution in which the catalytically active compounds are dissolved. In "dry" impregnation, the catalytically active compounds are adsorbed into the refractory support material at one time. The support is then dried and calcined.

In the present invention, the support is impregnated by a chemical adsorption in one single phase. An extruded alumina support meeting the above-mentioned specifications as to pore area, pore volume, macropore concentration, and most importantly adsorption site availability is put into contact with a solution containing preferably a molybdenum compound such as ammonium molybdate, ammonium paramolybdate, molybdenum oxalate or molybdenum pentachloride or the corresponding soluble salt of another Group VIb metal, as dissolved in water at a certain pH. The catalyst pellets are then washed with water in order to remove all of the non-adsorbed metal on the reaction surface, so as to obtain a composition limited to 3% hydrogenating compound. The impregnation phase lasts for a period of four hours at ambient temperature and with moderate agitation. In all cases the pH of the impregnating solution is controlled by means of a pH buffer. At the end of four hours, the molybdenum solution is emptied, the catalyst is washed with 10 volumes of water per volume of catalyst pellets, and the wet impregnated catalyst is placed in a drying furnace having forced air circulation, where the pellets are maintained at 120° C. for 24 hours at preferably atmospheric pressure. Finally, the pellets are calcined at 500° C. for a period of 1–24 hours, forcing an air flow of 5–10 m³ of air per hour and kilogram of catalyst through the calcining furnace.

The adsorption of small quantities of a Group VIb hydrogenation compound into the support does not appreciably change the physical properties of the catalyst. Thus, the surface area, pore volume, and macropore ratios do not change between nonimpregnated catalyst pellets and pellets impregnated according to the process of the invention.

The surface composition of the resultant catalyst was analyzed by XPS (X-ray photoelectron spectroscopy), a technique consisting of energizing the atoms of any material by X-rays and measuring the energy spectrum of the electrons emitted by photoemission. XPS studies were carried out on the catalyst of the invention using an A.E.I. ES-200B apparatus which consists of an X-ray source, an energy analyzer and a detection system. The apparatus is equipped with an aluminium cathode ($h\nu = 1487$ eV, 300 W). Cl s (285 eV) and Al 2p (74.8 eV) were taken as references to calculate the photoelectron energies. The area underneath the Mo 3d peak was compared to the area underneath the aluminum 2p peak to calculate signal band intensity ratios.

The ratio between molybdenum and aluminum surface signal intensitites as obtained by the above method ranged between 0.6 and 0.9, showing a good dispersion of hydrogenating metal on the alumina support. Neither massive $MoO_3$ nor $Al_2(MoO_4)_3$ were found by RAMAN spectroscopic analysis (bands at 1000 and 830 cm$^{-1}$, and 1010 and 360 cm$^{-1}$, respectively). Moreover, after operating for a prolonged period at a ratio of more than 2.5 tons of feedstock per kg of catalyst, the catalyst retains a high dispersion value of Group VIb hydrogenating metal, as shown by an XPS signal band strength ratio of between 0.4 and 0.6.

Before use, the catalyst must be sulfurized under tightly controlled conditions so as not to destroy the single molybdenum layer present on the catalyst reaction surface. Sulfurizing conditions include a temperature range of 200°–400° C. preferably 250°–300° C. and a pressure variable between atmospheric and high. The sulfurizing agent can be elemental sulfur, mercaptans, thiophene, or mixtures of hydrogen and hydrogen sulfide.

After sulfurization, the catalyst is ready to be used in either a conventional fixed bed reactor or an ebullating bed reactor.

One advantage of the catalyst of the invention is its low cost due to the low content of hydrogenating metal and its economic method of preparation. Alumina of the requisite large surface area and high porosity can be purchased on the market or be prepared or modified by precipitation and emulsion.

A technological improvement disclosed by the invention over the prior art resides in the fact a good catalyst is obtained which has a high demetallizing activity over an extended period of operation. The resultant reduced catalyst replacement rate represents a commercial advantage in the refining of heavy crudes and residues.

The catalyst of the invention may be used to hydrodemetallize heavy hydrocarbon feedstocks which have high concentrations of such metals as nickel, vanadium and iron. Typical hydrotreatment conditions under which the catalyst may be employed are as follows: temperatures from 360° to 415° C., hydrogen pressures between 600 and 3000 psi, feed to catalyst ratios ranging from 0.1 to 10 vol. vol.-hr., and $H_2$:feed ratios between 1,000 and 10,000 SCFB.

Under hydrotreatment conditions including a temperature ranging from 300° to 450° C., pressures between 600 and 3500 psi(g), an LHSV between 0.05 and 5 vol./(vol.)(hr.), $H_2$:feed ratios between 300 and 20,000 SCFB and $H_2$ partial pressures between 500 and 3000 psi(g), the deactivation of the catalyst will be sufficiently low that the reaction temperature will need to be raised less than 50° C. to compensate for the activity loss. During its service life, the catalyst of the invention will be able to absorb more than 20% of its weight in vanadium and other metallic hydrocarbon contaminants.

EXAMPLE NO. 1

Comparative tests were conducted using a support made of dense alumina and having a special pore diameter distribution (Support I), a commercial support modified with 0.5% MgO (Support II), and a commercial support of the prior art (Support III). The physical and chemical properties of these supports are set out in Table 1. The tests studied the supports' maximum adsorption capacity of molydenum, as measured by the change of molybdenum content in the impregnating solution. The test temperature was 25° C., and the solution pH was kept at 8 through use of a buffer. The ratio of the impregnating solution volume to the retention volume of the support was maintained at 0.5.

FIG. 1 shows the isotherm of chemical adsorption of molybdenum for the two supports according to the invention and of the one prior art commercial support. Support $A_I$ is the same as Support I as impregnated by $MoO_3$, and its data curve points are shown by boxes. Support $A_{II}$ is the same as Support III as impregnated by $MoO_3$, and its data curve points are shown by black dots. The data curve points for the prior art support (Support III) are shown by open circles. Note that both Support I and Support II can adsorb only 3% of their weight in $MoO_3$, while the prior art support adsorbs 15% of its weight in $MoO_3$. Preparatory to further tests, the support structures thus impregnated were washed, dried and calcined at 500° C. for 24 hours using an air flow of 6 cm³ of air per hour per kilogram of catalyst.

EXAMPLE NO. 2

Five catalysts identified by $A_I$, $A_{II}$, B, C and D were prepared, using hydrogenating metals of Group VIb and an alumina support material of types I, II or III, as extruded in 1/16" size.

CATALYST $A_I$: The chemical absorption of molybdenum was carried out using Support I and $(NH_4)_6Mo_7O_{24}.4H_2O$ as a precursor salt of $MoO_3$. After drying and calcining, the catalyst contained 3.1% by weight of $MoO_3$, based on the total weight of the catalyst.

CATALYST $A_{II}$: The chemical adsorption of molybdenum was carried out using Support II, the type modified with 0.5% MgO. $(NH_4)_6Mo_7O_{24}.4H_2O$ was used as the precursor salt of the metal oxide. After having been dried and calcined, the catalyst contained 3.2% by weight of $MoO_3$ and 0.5% MgO based on the total weight of the catalyst.

CATALYST B: The chemical adsorption of tungsten was carried out using Support I and $(NH_4)_{10}W_{12}O_{41}.5H_2O$ as a precursor salt of the metal oxide. After having been dried and calcined, the catalyst contained 2.8% $WO_3$ by weight as based on the total weight of the catalyst.

CATALYST C: The chemical adsorption of chromium was carried out, using Support I and $Cr(NO_3)_3.9H_2O$ as a precursor salt of the metal oxide. After the drying and calcining of the catalyst, it contained 3.01% by weight of $Cr_2O_3$ based on the total weight of the catalyst.

CATALYST D: The chemical adsorption of molybdenum was carried out, using Support III (prior art) and $(NH_4)_6Mo_7O_{24}.4H_2O$ as a precursor salt of the metal oxide. After drying and calcining, the support as first impregnated with molybdenum, the chemical adsorption of cobalt was next carried out, using the salt $Co(NO_3)_2.6H_2O$. After a second drying and calcining, the catalyst contained 15.1% $MoO_3$ and 3.5% CoO by weight as based on the total weight of the catalyst.

TABLE 1

| PHYSICAL AND CHEMICAL PROPERTIES OF THE SUPPORTS | | | |
|---|---|---|---|
| | SUPPORT I | SUPPORT II | SUPPORT III |
| PHYSICAL AND CHEMICAL PROPERTIES | | | |
| % $Al_2O_3$ | 99.8 | 99.5 | 99.8 |
| % MgO | 0.0 | 0.5 | 0.0 |
| SIZE (INCHES) | 1/16 | 1/16 | 1/16 |
| SURFACE AREA, m²/g (BET) | 292 | 280 | 300 |
| PORE VOLUME (cc/g) | 1.06 | 1.03 | 1.07 |
| PORE DIAMETER (Å) | 145 | 147 | 143 |
| REAL DENSITY (g/cc) | 6.14 | 5.60 | 5.58 |
| APPARENT DENSITY (g/cc) | 0.82 | 0.80 | 0.77 |
| DISTRIBUTION OF PORES (%) DIAMETER | | | |
| 20–30 Å | — | — | — |
| 30–60 Å | 2.94 | 19.30 | 19.30 |
| 60–90 Å | 37.25 | 19.10 | 19.10 |
| 90–150 Å | 11.76 | 12.08 | 13.08 |
| 150–300 Å | 8.82 | 8.15 | 7.13 |
| 300–10³ Å | 6.86 | 3.60 | 3.57 |
| 10³ Å | 32.35 | 37.77 | 38.05 |

Table 2 summarizes the physical and chemical properties of the five catalysts.

Table 3 shows the results of an analysis by X-ray photoelectron spectroscopy (XPS) and Raman spectroscopy (RAMAN) of the catalysts. Note that the catalyst has a high quantity of well-dispersed metal exposed in the catalyst surface in a single layer form. Conversely, although prior art catalyst D has a good surface dispersion of molybdenum, the presence of undesirable compounds such as massive $MoO_3$ and $Al_2(MoO_4)_3$ is observed, which compounds are absent in the catalyst of the invention.

EXAMPLE NO. 3

The five catalysts of Example 2 were used to hydrodemetallize two different test feedstocks. The first test feedstock was an atmospheric gas oil having dissolved in it a vanadyl porphyrin as a test molecule. The second test feedstock was a whole Morichal Crude which, as typical of heavy Venezuelan crudes, has high concentrations of nickel, vanadium and iron. The characteristics of the vanadil porphyrin test batch and the whole Morichal crude are set out in Table 4.

TEST WITH VANADIL PORPHYRIN BATCH: The tests were conducted in a 120 ml capacity Carberry type microreactor. Basically this is a batch reactor in which the catalyst, contained in a small basket, rotates within a cylindrical stainless steel receptacle filled with hydrogen/batch mixture.

TABLE 2

CHEMICAL AND PHYSICAL PROPERTIES OF THE CATALYSTS IN EXAMPLE 2

|  | $A_I$ | $A_{II}$ | B | C | D (1) |
|---|---|---|---|---|---|
| CHEMICAL AND PHYSICAL PROPERTIES |  |  |  |  |  |
| % METAL GROUP VIb | 3.1 | 3.2 | 2.8 | 3.01 | 15.1 |
| % CoO | — | — | — | — | 3.5 |
| SURFACE AREA, $m^2/g$ (BET) | 292 | 280 | 270 |  | 300 |
| PORE VOLUME (cc/g) | 1.06 | 1.03 | 1.03 | 1.07 | 1.07 |
| AVERAGE PORE DIAMETER (Å) | 145 | 147 | 152 | 143 | 143 |
| DENSITY OF BED (g/cc) | 0.56 | 0.41 | 0.56 | 0.41 | 0.41 |
| ACTUAL DENSITY (g/cc) | 6.14 | 5.60 | 6.15 | 5.58 | 5.58 |
| APPARENT DENSITY | 0.82 | 0.80 | 0.83 | 0.77 | 0.77 |
| STRENGTH (g/cc) BULK CRUSHING OF BED (kg/cm$^2$) | 4.8 | 7.2 | 4.9 | 7.16 | 7.16 |
| DISTRIBUTION OF PORES (%): DIAMETER |  |  |  |  |  |
| 20-30 Å | — | — | — | — | — |
| 30-60 Å | 2.94 | 19.30 | 3.00 | 3.20 | 19.30 |
| 37-90 Å | 37.25 | 19.10 | 37.30 | 37.10 | 19.10 |
| 90-150 Å | 11.76 | 12.08 | 11.76 | 12.00 | 13.08 |
| 150-300 Å | 8.86 | 8.75 | 8.80 | 8.81 | 7.13 |
| 300-10$^3$ Å | 6.86 | 3.60 | 6.90 | 7.00 | 3.57 |
| >10$^3$ Å | 32.35 | 37.77 | 32.24 | 31.89 | 38.05 |

(1) support of catalyst D as modified with 0.5% MgO.

TABLE 3

QUANTITY OF METALS IN THE SURFACE OF THE CATALYSTS IN EXAMPLE 2 AS DETECTED BY XPS AND RAMAN SPECTROSCOPY

| CATALYST | % DEPOSITED METAL | XPS I (metal (VIb))/I(Al) Surface metal | RAMAN DETECTED COMPOUNDS |
|---|---|---|---|
| $A_I$ | $MoO_3$: 3.1 | 0.70 | well-defined single layer of molybdenum |
| $A_{II}$ | MoO: 0.5 $MoO_3$: 3.2 | 0.85 | — |
| B | $WO_3$: 2.8 | 0.62 | — |
| C | $Cr_2O_3$: 3.01 | 0.78 | — |
| D | $MoO_3$: 15.1 CoO: 3.5 | 0.70 | massive $MoO_3$ + $Al_2(MoO_4)_3$ + POLYMOLYBDATE |

TABLE 4

CHARACTERISTICS OF THE HEAVY CRUDE AND THE TEST BATCH USED TO DEMONSTRATE THE CATALYST OF THE INVENTION

| CHARACTERISTICS | WHOLE MORICHAL CRUDE | TEST BATCH (GAS OIL + VANADIL PORPHYRIN) |
|---|---|---|
| SPECIFIC GRAVITY °API | 11.8 | 37.2 |
| SULFUR (% BY WEIGHT) | 2.85 | 0.5 |
| VANADIUM (ppm) | 331 | 18.0 |
| NICKEL (ppm) | 89.1 | — |
| NITROGEN (ppm) | 5,830 | <200 |
| CONRADSON CARBON, % BY WEIGHT | 12.0 | — |
| ASPHALTENES (%) | 9.0 | 0.05 |
| KINETIC VISCOSITY (CST) AT 140° F. | 600 | — |
| WATER (% BY WEIGHT) | 0.1 | — |
| DISTILLATION TBP-ASTM D-2892: |  |  |
| 375° F. | — | — |
| 375-650° F. | 10.8 | 100 |
| 650-950° F. | 30.7 | — |
| 950° F.+ | 58.5 | — |

The test unit is provided with automatic controls for pressure, flow of reagents and temperature. The furnace for the microreactor is a cylindrical block which is heated electrically by five heating resistors at 120 volts and 250 watts. The temperature control was effected by an immersed thermocouple made of nickel-chrome. The operating conditions for the vanadyl porphyrin tests were held constant at: temperature=350° C., pressure=1000 psi, volume of batch=80 ml, mass of the catalyst=3.5 grams, catalyst particle size=1/32", reaction time=10 hours.

TEST WITH MORICHAL CRUDE BATCH: These tests were performed in a fixed bed unit, in which the liquid batch and the hydrogen are mixed in a zone prior to the reactor. The effluent from the reactor went to a high pressure separator, where gas and liquid are separated. After being purged of dissolved gases with nitrogen, the liquid was analyzed for metals content.

Approximately 60 cc of catalyst were placed on the center of the reactor (54 cm × 1.875 cm inner diameter), which reactor was provided with a heat well having an inner diameter of 0.635 cm. The operating conditions were as follows: temperature=400° C.; pressure=1500 psig; LHSV=1 vol$^{-1}$ h$^{-1}$; H$_2$/feed ratio=800 m$^3$(STP)/m$^3$.

The catalysts used both for the vanadyl porphyrin test and for the Morichal Crude test were presulfurized under the following conditions: Pressure=400 psi, temperature=250° C., time=10 hours, presulfurizing batch=gas oil+1.7% by weight of sulfur (CS$_2$); H$_2$/feed=600 m$^3$(STP)/m$^3$.

Table 5 contains the data of activity obtained from the experiments with the vanadyl porphyrin test batch and the Morichal Crude batch. The activity is expressed as the percentage of vanadium extracted from the batch subjected to the test. In the vanadyl prophyrin test, all the catalysts demonstrate a comparable activity. However, when a whole Morichal crude is used as a feed, catalysts $A_I$, $A_{II}$, B, and C present a greater demetallizing (hydrodevanadizing) activity than the prior art catalyst D. This demetallizing activity is stable through 200 hours of processing. With respect to hydrodesulfurizing (HDS) activity, prior art catalyst D presents a higher activity, but it is well known in the art that by eliminating the metallic promoter of Group VIII of the Periodic Table from HDS catalysts, the catalytic activity decreases.

In Table 6 the characteristics of the products obtained in the processing of the whole Morichal Crude are shown, using the catalyst $A_I$ and prior art catalyst D. Both sets of products have rather similar properties.

TABLE 5
HYDRODEVANADIZATION AND HYDRODESULFURIZATION OF THE TEST BATCHES IN EXAMPLE 3

| CATALYST | % HDV, VANADIL PORPHYRIN TEST BATCH | % HDV, MORICHAL CRUDE INITIAL 24 h | % HDV, MORICHAL CRUDE FINAL 200 h | % HDS, MORICHAL CRUDE INITIAL 24 h | % HDS, MORICHAL CRUDE FINAL 200 h |
|---|---|---|---|---|---|
| $A_I$ | 98.5 | 38.9 | 38.7 | 32.9 | 30.5 |
| $A_{II}$ | 99.2 | 36.8 | 37.2 | 37.2 | 37.2 |
| B | 98.3 | 30.9 | 30.9 | 9.8 | 10.5 |
| C | 99.2 | 36.4 | 36.4 | 10.8 | 10.5 |
| D | 99.5 | 28.9 | 27.9 | 43.6 | 44.2 |

TABLE 6
CHARACTERISTICS OF PRODUCT AFTER TREATMENT WITH CATALYST $A_I$ AND CONVENTIONAL CATALYST D

| PROPERTIES | MORICHAL CRUDE | CATALYST[1] $A_I$ PRODUCT | CATALYST D PRODUCT |
|---|---|---|---|
| GRAVITY, API° | 11.8 | 15.2 | 15.8 |
| SULFUR (% BY WEIGHT) | 2.85 | 1.90 | 1.25 |
| VANADIUM (ppm) | 331 | 203 | 238.3 |
| NITROGEN (ppm) | 5,830 | 4,015 | 4,140 |
| CONRADSON CARBON (% BY WEIGHT) | 12.0 | 6.9 | 6.8 |
| ASPHALTENES (% BY WEIGHT) | 9.0 | 5.40 | 6.0 |
| KINETIC VISCOSITY (CST) AT 140° F. | 600 | 40 | 41 |
| % DISTILLATION, TBP: | | | |
| C4-375° F. | — | 6.25 | 5.35 |
| 375-650° F. | 10.8 | 28.8 | 25.8 |
| 650-950° F. | 30.7 | 26.5 | 26.4 |
| 950° F.+ | 58.5 | 38.5 | 42.5 |

[1]AVERAGE VALUES OBTAINED DURING A 200 HOUR RUN AT 390° C., P = 1500 PSIG AND LSHV = 0.9 h$^{-1}$, USING A WHOLE MORICHAL CRUDE.

Figure 2:
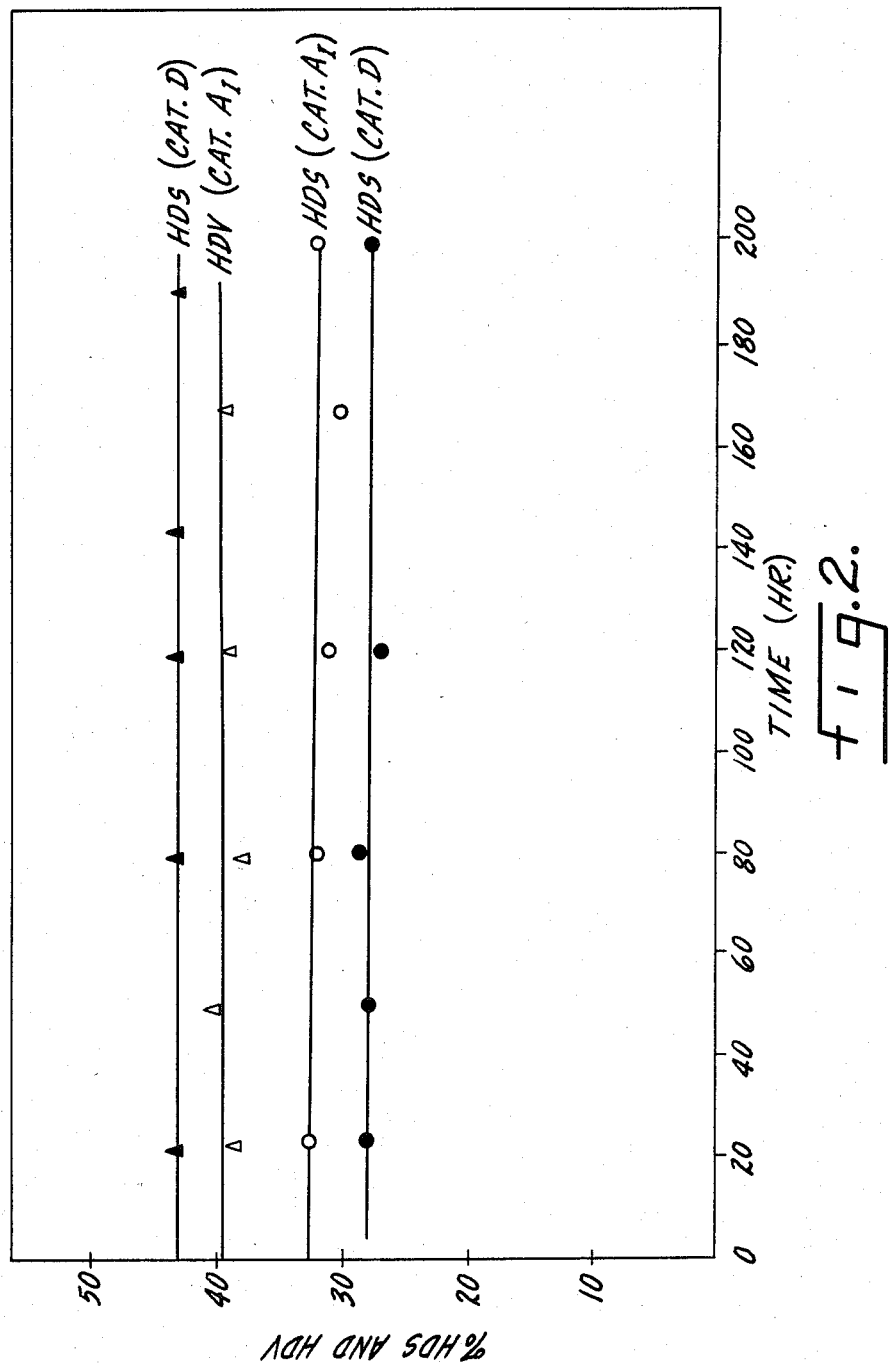
FIG. 2 is a graph of the percentages of hydrodevanadization and hydrodesulfurization over a period of time on a continuous feed of Morichal crude, as effected by a prior art catalyst and the catalyst of the invention as shown by Example 3.

FIG. 2 shows the HDS and HDV activities with respect to time for catalyst $A_I$ and prior art catalyst D. Both catalysts are shown to be stable. Catalyst $A_I$, however, can demetallize a hydrocarbon feedstock even though it contains low percentages of hydrogenating metal, and can at the same time retain a high dispersion of the deposited active compound.

EXAMPLE NO. 4

This example shows the distribution of metals deposited in catalyst $A_I$ and prior art catalyst D after operating for 180 days in the processing a complete Morichal Crude at a temperature of 390° C., a pressure of 1500 psig and an LHSV = 0.9 h$^{-1}$.

Table 7 sets forth the results from an XPS analysis of the catalysts as freshly prepared and after being used for 180 days. The concentration of surface hydrogenating metal in catalyst $A_I$ changes little with respect to operating time, while catalyst D loses after 180 days' use almost the entirety of its active metal.

Figure 3:
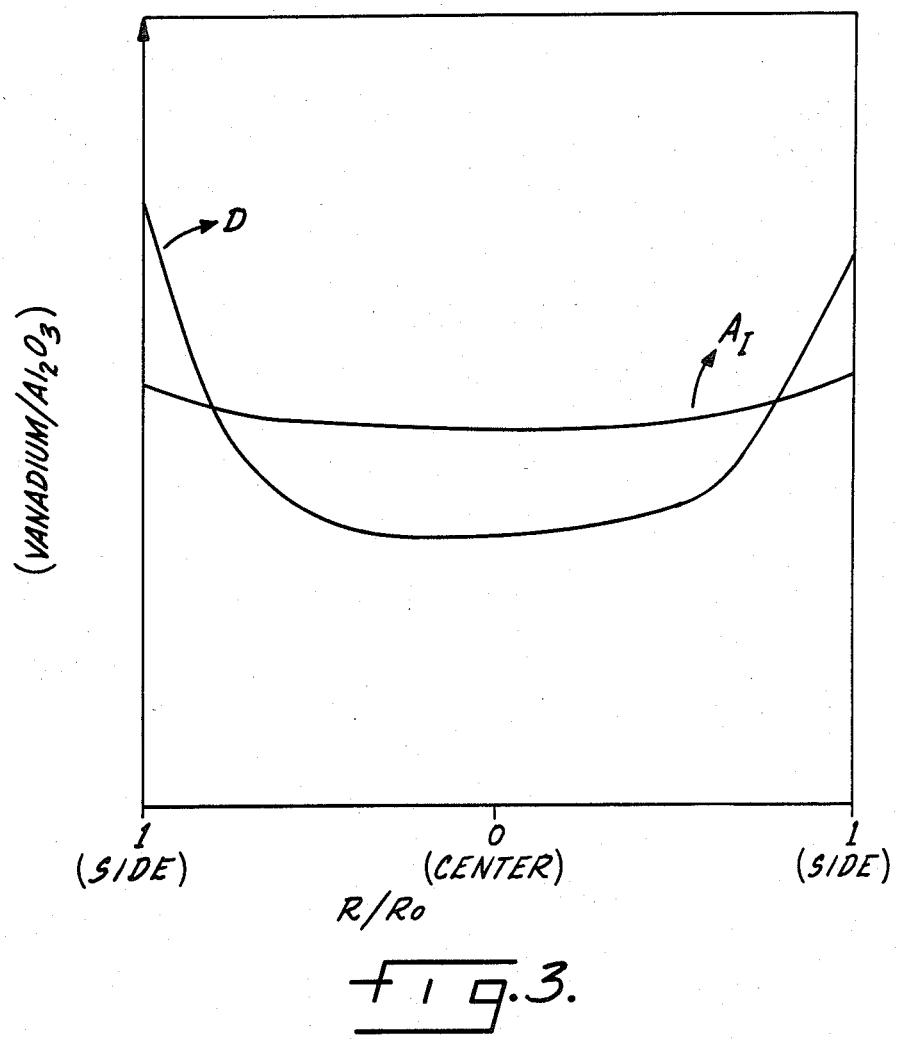
FIG. 3 shows the buildup of vanadium on the interior and exterior reaction surfaces of a prior art catalyst and the catalyst of the invention under the operating conditions described in Example 4.

FIG. 3 shows for this same example how the vanadium is deposited. While prior art catalyst D has its vanadium deposited toward the exterior of the extrusion product, the relative deposition of vanadium for catalyst $A_I$ is almost uniform throughout the catalyst interior. This shows a more effective use of available reaction surface.

TABLE 7
XPS RESULTS OBTAINED FROM FRESH AND USED CATALYSTS
XPS SIGNAL BAND STRENGTH RATIOS

| CATALYST | I(Mo)/I(Al) % DEPOSITED | I(Mo)/I(Al) % ON REACTION SURFACE | I(V)/I(Al) % DEPOSITED | I(V)/I(Al) % ON REACTION SURFACE |
|---|---|---|---|---|
| $A_I$ (FRESH) | 3.1 | 0.70 | 0 | 0 |
| $A_I$ (AFTER 180 DAYS) | 3.1 | 0.56 | 23.5 | 0.15 |
| D (FRESH) | 15.1 | 0.70 | 0 | 0 |
| D (AFTER 180 DAYS) | 15.1 | 0.14 | 14.9 | 0.23 |

We claim:

1. A catalyst for the hydrotreatment of heavy crudes and residues, comprising
   a refractory support material,
   said support material having a pore volume of about 1 cm$^3$/g,
   between 40 and 80 percent of said pore volume consisting of pores having diameters greater than 300 Angstroms,
   said pores having diameters according to the following approximate percentage distribution:
   30 to 35% of pores greater than 1000 Angstroms;
   5 to 10% of pores from 300 to 1000 Angstroms;
   6 to 11% of pores from 150 to 300 Angstroms;
   10 to 12% of pores from 90 to 150 Angstroms;
   30 to 40% of pores from 60 to 90 Angstroms;
   1 to 7% of pores from 30 to 60 Angstroms; and
   less than 1% of pores from 20 to 30 Angstroms
   said support material having a surface area of about 270 to about 290 m$^2$/g; a real density greater than 6 grams per cubic centimeter and
   a hydrogenating metallic compound,
   the metal component of said hydrogenating compound being selected from the elements of Group VIb of the Periodic Table,
   said support material having a limited number of chemical adsorption sites for said hydrogenating metal, such that
   during impregnation of said support material by a solution containing said hydrogenating compound between 0.5 and 3% by weight of said hydrogenating compound, calculated as oxide of the corresponding Group VIb metal, with respect to the total weight of the catalyst, is irreversibly adsorbed by said support material.

2. The catalyst of claim 1, further comprising
an adsorption site restricting compound selected from the oxides of the following elements: magnesium, zinc, gallium, manganese and iron,
said adsorption site restricting compound being present in quantities of between 0.2 and 4% by weight of the total catalyst.

3. The catalyst of claim 1 further characterized in that
said hydrogenating compound is deposited in a monolayer on the reaction surface of said refractory support material.

4. The catalyst of claim 7 wherein
said refractory material comprises alumina,
said hydrogenating compound comprising a soluble salt, acid or organic base of molybdenum.

5. The catalyst of claim 1 wherein the refractory support material is alumina having a surface area of about 280 to about 290 m$^2$/g and the hydrogenating metallic compound on the support material is molybdenum, present in an amount of about 3% by weight calculated as MoO$_3$.

6. A method for the preparation of a catalyst for the hydrotreatment of heavy crudes and residues, comprising the following steps:
obtaining a refractory support material selected from the group consisting of silica, alumina and mixtures thereof,
extruding the support material into pellets,
impregnating said extruded pellets with a solution containing a hydrogenating compound or a precursor thereof, so as to form catalyst structures,
said hydrogenating compound or precursor thereof having a metallic component selected from Group VIb of the Periodic Table,
said extruded pellets having, before impregnation, chemical absorption sites that irreversibly absorb said hydrogenating compound in an amount from 0.5 to 3% of the total weight of the completed catalyst, calculated as the oxide of said Group VIb metal;
said extruded pellets having a pore volume of about 1 cm$^3$/gm, and from 40 to 80% of the pore volume consisting of pores having diameters greater than 300 Angstroms,
said pores having diameters according to the following approximate percentage distribution:
30 to 35% of pores greater than 1000 Angstroms;
5 to 10% of pores from 300 to 1000 Angstroms;
6 to 11% of pores from 150 to 300 Angstroms;
10 to 12% of pores from 90 to 150 Angstroms;
30 to 40% of pores from 60 to 90 Angstroms;
1 to 7% of pores from 30 to 60 Angstroms; and
less than 1% of pores from 20 to 30 Angstroms
said extruded pellets having a surface area of about 270 to about 290 m$^2$/g, a real density greater than 6 grams per cubic centimeter;
washing the catalyst structures in order to remove non-absorbed hydrogenating compound or its precursor;
drying the catalyst structures;
calcining the catalyst structures in a hot air current whose temperature ranges from 400° to 600° C. and whose rate of flow is 40-100 ml/(hour) (g of catalyst) for a period of between one and twenty-four hours;
sulfurizing the catalyst structures using a sulfur-containing compound selected from the following compounds: elemental sulfur, mercaptans, thiophene, and hydrogen sulfide;
said sulfurization taking place at a temperature between 200° and 400° C.

7. The method of claim 6 further comprising an additional step following the extrusion of the refractory material,
said step comprising the impregnating of the extruded product with a solution of an absorption site restricter which is selected from the group consisting of oxides of magnesium, zinc, gallium, manganese and iron to provide in the catalyst the absorption site restricter in an amount of about 0.2 to about 4 percent by weight, based on the total weight of the catalyst.

8. The method of claim 7 further characterized in that said adsorption site restricter comprises magnesium oxide, and is present in the final catalyst in quantities ranging from 0.25 to 3% by weight of the total catalyst.

* * * * *

UNITED STATES PATENT AND TRADEMARK OFFICE
CERTIFICATE OF CORRECTION

PATENT NO. : 4,525,472

DATED : June 25, 1985

INVENTOR(S) : Alfredo Morales, Roberto Galiasso and Angel R. Carrasquel

It is certified that error appears in the above-identified patent and that said Letters Patent is hereby corrected as shown below:

Col. 1, line 36, "3,989,155" should be -- 3,898,155 --.

Col. 1, line 67, "two" (first occurrence) should be deleted.

Col. 7, line 66, "MoO:0.5" should be -- MgO:0.5 --.

Col. 11, line 14, "claim 7" should be -- claim 1 --.

Signed and Sealed this

Third Day of December 1985

[SEAL]

Attest:

DONALD J. QUIGG

Attesting Officer

Commissioner of Patents and Trademarks